US006989768B2

(12) United States Patent
DeMarco et al.

(10) Patent No.: US 6,989,768 B2
(45) Date of Patent: Jan. 24, 2006

(54) RECOGNITION/ANTI-COLLISION LIGHT FOR AIRCRAFT

(75) Inventors: Ralph Anthony DeMarco, Palm Harbor, FL (US); Raymond Henry Draves, Safety Harbor, FL (US); Timothy Scott Kielbon, Lutz, FL (US); Todd Christopher Knight, Tampa, FL (US); Anish Vikram Patel, Odessa, FL (US); Merle Keith Stephens, St. Petersburg, FL (US)

(73) Assignee: Goodrich Corporation, Charlotte, NC (US)

( * ) Notice: Subject to any disclaimer, the term of this patent is extended or adjusted under 35 U.S.C. 154(b) by 22 days.

(21) Appl. No.: 10/653,847

(22) Filed: Sep. 2, 2003

(65) Prior Publication Data

US 2004/0075575 A1 Apr. 22, 2004

Related U.S. Application Data

(62) Division of application No. 09/933,935, filed on Aug. 21, 2001, now Pat. No. 6,642,856, which is a division of application No. 09/187,495, filed on Nov. 6, 1998, now Pat. No. 6,278,382.

(51) Int. Cl.
    *B64D 47/06* (2006.01)

(52) U.S. Cl. ............... 340/981; 362/470; 362/548
(58) Field of Classification Search .......... 340/981, 340/458, 931, 642, 641, 331, 332, 953, 933, 340/947, 982, 984; 362/470, 240, 477, 548, 362/549, 347, 361; 250/344; 315/130, 65, 315/93, 129, 133, 88
    See application file for complete search history.

(56) References Cited

U.S. PATENT DOCUMENTS

| | | | |
|---|---|---|---|
| 1,999,885 A | 4/1935 | Tarlton | 177/329 |
| 3,309,563 A | 3/1967 | McKienzie | 315/83 |
| 3,504,339 A * | 3/1970 | Bailey | 362/263 |
| 3,731,082 A | 5/1973 | Blaylock | 240/10.5 |
| 4,346,430 A * | 8/1982 | Holland | 362/470 |
| 4,425,604 A * | 1/1984 | Imai et al. | 362/223 |
| 4,513,357 A * | 4/1985 | Nieda et al. | 362/544 |
| 4,594,614 A | 6/1986 | Frank et al. | 358/214 |
| 4,985,814 A * | 1/1991 | Lyons | 362/240 |
| 5,045,982 A * | 9/1991 | Lyons | 362/241 |
| 5,243,340 A | 9/1993 | Norman et al. | 340/953 |
| 5,247,280 A | 9/1993 | Brooks | 340/458 |

(Continued)

FOREIGN PATENT DOCUMENTS

| | | |
|---|---|---|
| GB | 1123919 | 8/1968 |
| GB | 1182231 | 2/1970 |

OTHER PUBLICATIONS

Anti–Collision Strobe Light System High Intensity Red >400 ECP, Sep. 9, 1998.

*Primary Examiner*—Brent A. Swarthout
(74) *Attorney, Agent, or Firm*—Renner, Otto, Boisselle & Sklar, LLP (57) ABSTRACT

A recognition light includes a reflector having an axis and first and second annular semi-parabolic reflective surfaces which have respective focal points axially spaced apart from one another, and first and second annular lamps respectively disposed at the focal points. A cover surrounds the reflector and lamps and includes a lens for focusing the light along a plane perpendicular to the axis of the reflector, the lens including first and second Fresnel lens portions each including a convex lens and a prism lens, the convex lenses being disposed adjacent one another and transaxially aligned with the first and second lamps, respectively. A light detector detects light emitted from at least one of the lamps, a monitor circuit provides a fail signal when a characteristic of the light output of at least one of the lamps does not satisfy a specified criteria, and a control circuit first activates the first lamp and then the second lamp in response to receipt of the fail signal of the monitor circuit.

11 Claims, 6 Drawing Sheets

U.S. PATENT DOCUMENTS

| | | | | |
|---|---|---|---|---|
| 5,293,304 A | * | 3/1994 | Godfrey | 362/464 |
| 5,408,232 A | | 4/1995 | Tsai et al. | 340/907 |
| 5,422,716 A | | 6/1995 | Dempsey | 356/218 |
| 5,446,277 A | | 8/1995 | Rutter | 250/214 R |
| 5,561,346 A | * | 10/1996 | Byrne | 313/512 |
| 5,654,794 A | | 8/1997 | Rutter et al. | 356/151 |
| 5,705,808 A | | 1/1998 | Filo | 250/214 P |
| 5,929,788 A | * | 7/1999 | Vukosic | 340/908.1 |
| 5,955,945 A | | 9/1999 | Fuhrer | 340/479 |
| 6,097,549 A | * | 8/2000 | Jenkins et al. | 359/726 |
| 6,190,020 B1 | * | 2/2001 | Hartley | 362/184 |
| 6,278,382 B1 | * | 8/2001 | DeMarco et al. | 340/981 |

* cited by examiner

RECOGNITION/ANTI-COLLISION LIGHT FOR AIRCRAFT

This application is a divisional of U.S. patent application Ser. No. 09/933,935 filed on Aug. 21, 2001 now U.S. Pat. No. 6,642,856, U.S. patent application Ser. No. 09/187,495, filed Nov. 6, 1998, now U.S. Pat. No. 6,278,382, all of which are hereby incorporated herein by reference in their entirety.

FIELD OF THE INVENTION

The present invention relates to recognition/anti-collision lights and, more particularly, to a method and apparatus for extending the useful life of such lights and/or for detecting the failure of such lights.

BACKGROUND OF THE INVENTION

Recognition/anti-collision lights are used on aircraft to produce bright flashes of light readily visible to the human eye for improving recognition of the aircraft from the ground or from other aircraft. The FAA (Federal Aviation Administration) currently mandates that aircraft have such lights with an acceptable minimum effective light intensity of 100 or 400 candela (depending on the aircraft) when viewed within five degrees of a horizontal plane.

Many prior art recognition/anti-collision lights include a flashtube, or strobe light, that initially produces a light intensity that meets government guidelines. However, the light intensity of the flashtube gradually degrades with use over time and eventually falls below the minimum intensity requirements, thereby requiring servicing and/or replacement of the flashtube. The mean time between failure (MTBF) of a typical flashtube is about 1500–3000 hours.

Anti-collision lights are therefore periodically tested, in some instances with elaborate equipment, to ensure that they meet the FAA requirements. A common practice has been to replace the lights on a scheduled basis to ensure proper illumination requirements are met even though many of the lights still satisfy illumination requirements.

In order to reduce the frequency at which a recognition/anti-collision light requires replacement, it would be desirable to have an anti-collision light with an improved (increased) mean time between failure (MTBF).

SUMMARY OF THE INVENTION

The present invention provides a recognition/anti-collision light including, in a preferred embodiment, two flashtubes and a control system that sequentially operates the two flashtubes in order to extend the overall useful life of the light. The invention also provides a technique for extending the life of a single flashtube or multiple flashtubes.

According to one aspect of the invention, a recognition light comprises a reflector having an axis and first and second annular semi-parabolic reflective surfaces which have respective focal points axially spaced apart from one another, and first and second annular lamps respectively disposed at the focal points.

According to another aspect of the invention, a recognition light comprises a parabolic reflector, first and second annular lamps surrounding the reflector, and a lens cover surrounding the reflector and lamps, the lens cover including a lens for focusing the light along a plane perpendicular to the axis of the reflector, the lens including first and second Fresnel lens portions each including a convex lens and a prism lens, the convex lenses being disposed adjacent one another and transaxially aligned with the first and second lamps, respectively.

According to another aspect of the invention, a recognition light comprises first and second lamps, a light detector positioned to detect light emitted from at least one of the lamps, a monitor circuit connected to the light detector for providing a fail signal when a characteristic of the light output of at least one of the lamps does not satisfy a specified criteria, and a control circuit connected to the monitor circuit and the first and second lamps for first activating the first lamp and then the second lamp in response to receipt of the fail signal of the monitor circuit.

According to another aspect of the invention, a recognition light of an aircraft comprises a flashtube, a light detector positioned to detect light emitted from the flashtube, a monitor circuit connected to the light detector for measuring the intensity of the detected light and comparing the measured intensity with a reference value corresponding to a predetermined light intensity level, and a control circuit connected to the flashtube and monitor circuit for flashing the flashtube at a first power level and then at an increased power level when the measured intensity drops below the reference value, thereby to increase the intensity of the flashes emitted by the flashtube to above the predetermined light intensity level.

According to another aspect of the invention, a method for increasing the useful life of a recognition light of an aircraft comprises flashing a flashtube, monitoring the light output of the flashtube, comparing the measured light output of the flashtube with a reference value corresponding to a predetermined light intensity value, increasing the power delivered to the flashtube when the measured light output drops below the reference value, thereby to increase the intensity of the flashes emitted by the flashtube to above the reference value.

According to a further aspect of the invention, a method for monitoring the useful life of an aircraft recognition light comprises flashing a flashtube, and monitoring the light output of the flashtube with a light detector that converts the detected light output into an integrated output voltage corresponding to the light output of a plurality of flashes of the flashtube.

According to another aspect of the invention, a method for increasing the useful life of a recognition light comprises providing first and second lamps, operating the first lamp, monitoring a characteristic of the light output of the first lamp and providing a fail signal when the characteristic of the light output of the first lamp does not satisfy a specified criteria, and stopping operation of the first lamp and operating the second lamp in response to receipt of the fail signal.

According to another aspect of the invention, a method for providing visual notification of required replacement of an anti-collision light prior to failure of the anti-collision light, comprises providing an anti-collision light including a lamp, operating the lamp at a first flash rate at a light intensity above a predetermined light intensity value, and operating the lamp at a second flash rate distinguishable from the first rate when the light intensity of the lamp approaches the predetermined light intensity value.

According to get another aspect of the invention, a lamp fixture comprises an annular reflector and first and second annular lamps surrounding the reflector, and the reflector having a reflector surface configured to reflect light outwardly from the lamp fixture from both of the lamps.

The foregoing and other features of the invention are hereinafter fully described and particularly pointed out in the claims, the following description and the annexed drawings setting forth in detail one or more illustrative embodiments of the invention, such being indicative, however, of but one or a few of the various ways in which the principles of the invention may be employed.

DETAILED DESCRIPTION

Figure 1:
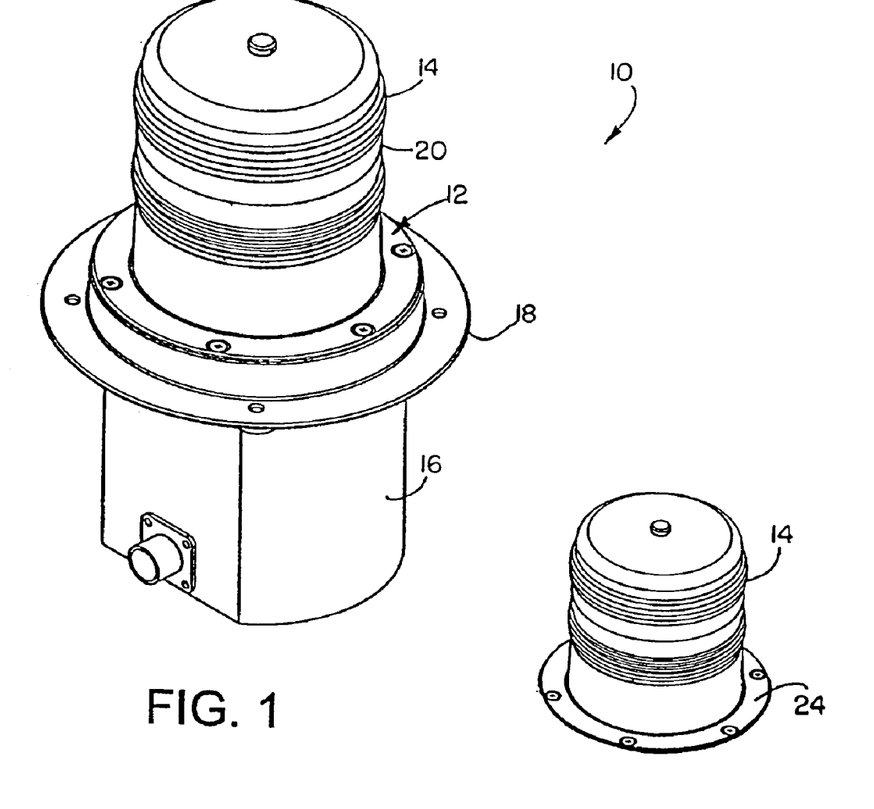
FIG. 1 is a perspective view of a light intensity monitoring system constructed in accordance with the present invention.
Figure 2:
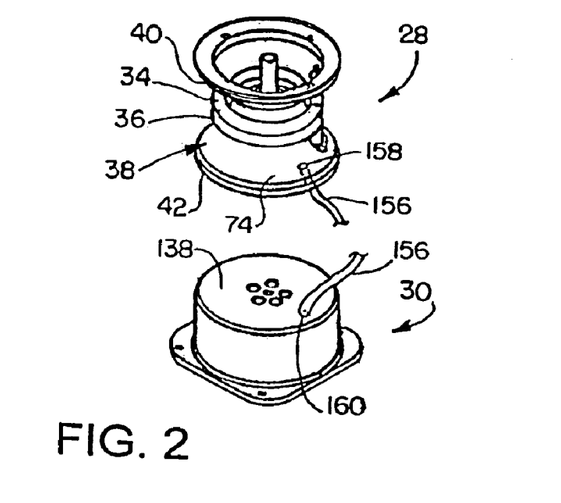
FIG. 2 is an exploded perspective view of the light of FIG. 1.
Figure 3:
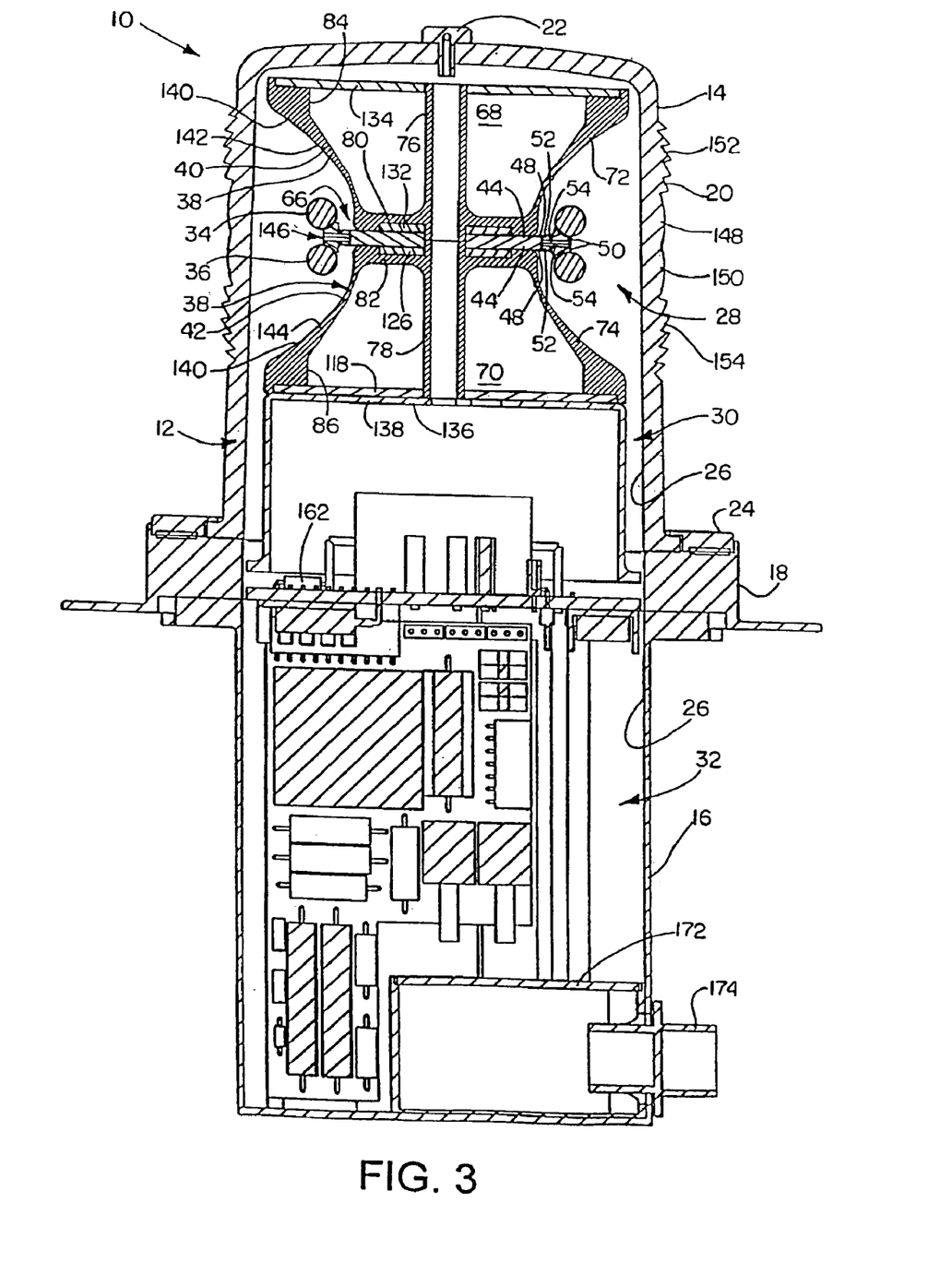
FIG. 3 is a cross-sectional view of the light of FIG. 1.

Referring now in detail to the drawings, and initially to FIGS. 1–3, a light constructed in accordance with the present invention is generally indicated at reference numeral 10. The light 10 was developed for use as an aircraft recognition/anti-collision light and is herein described chiefly in this context. However, those skilled in the art will appreciate that a light according to the invention will have other useful applications including but not limited to uses in other types of vehicles, in industrial applications, etc. It should be appreciated that such alternative applications are contemplated as falling within the scope of the present invention. It also should be appreciated that references herein to top and bottom, upper and lower, etc., are made in relation to the illustrated orientation of the light to describe positional relationships between components of the light and not by way of limitation, unless so indicated. Also, the terms "recognition" and "anti-collision" are used interchangeably.

As shown in FIGS. 1–3, the anti-collision light 10 includes a housing 12 composed of upper housing member or cover 14, a lower housing member or case 16, and a mounting plate 18 disposed between the cover 14 and case 16. The cover 14 is transparent and preferably has a Fresnel lens 20 integrally formed therein. The cover, which may also be provided with a conventional drain plug 22, is secured to the top side of the mounting plate 18 by a hold-down ring or lens bezel 24. The case 16 is fastened to the underside of the mounting plate 18 by fasteners (not shown) or other suitable means. Together, the cover 14, case 16 and mounting plate 18 define an interior region 26 for containing the internal components of the light 10, which internal components generally comprise a flashtube fixture assembly 28, a fixture base 30 and electrical circuit components 32 for supplying power to and controlling the flashtube fixture 28.

As seen in FIG. 3, the flashtube fixture assembly 28 includes two flashtubes 34 and 36 and a common spool-shaped reflector 38. The reflector 38 includes upper and lower reflector half spool members 40 and 42 that are axially aligned and coupled together. The reflector 38 is coupled to the fixture base 30 which, in turn, is fastened to the mounting plate 18.

The flashtubes 34 and 36, which are herein referred as a main or primary flashtube and a spare or secondary flashtube 36, respectively, are conventional circular-shaped (annular) flashtubes that are disposed circumferentially around the waist (smallest diameter portion) of the spool-shaped common reflector 38 in substantially parallel relation to one another. The main flashtube (or spare flashtube) 34 can be either the upper or lower flashtube shown in the illustrated light. The flashtubes 34, 36 preferably are supported in spaced apart parallel relationship, such as by respective centering spacers 44.

Figure 4:
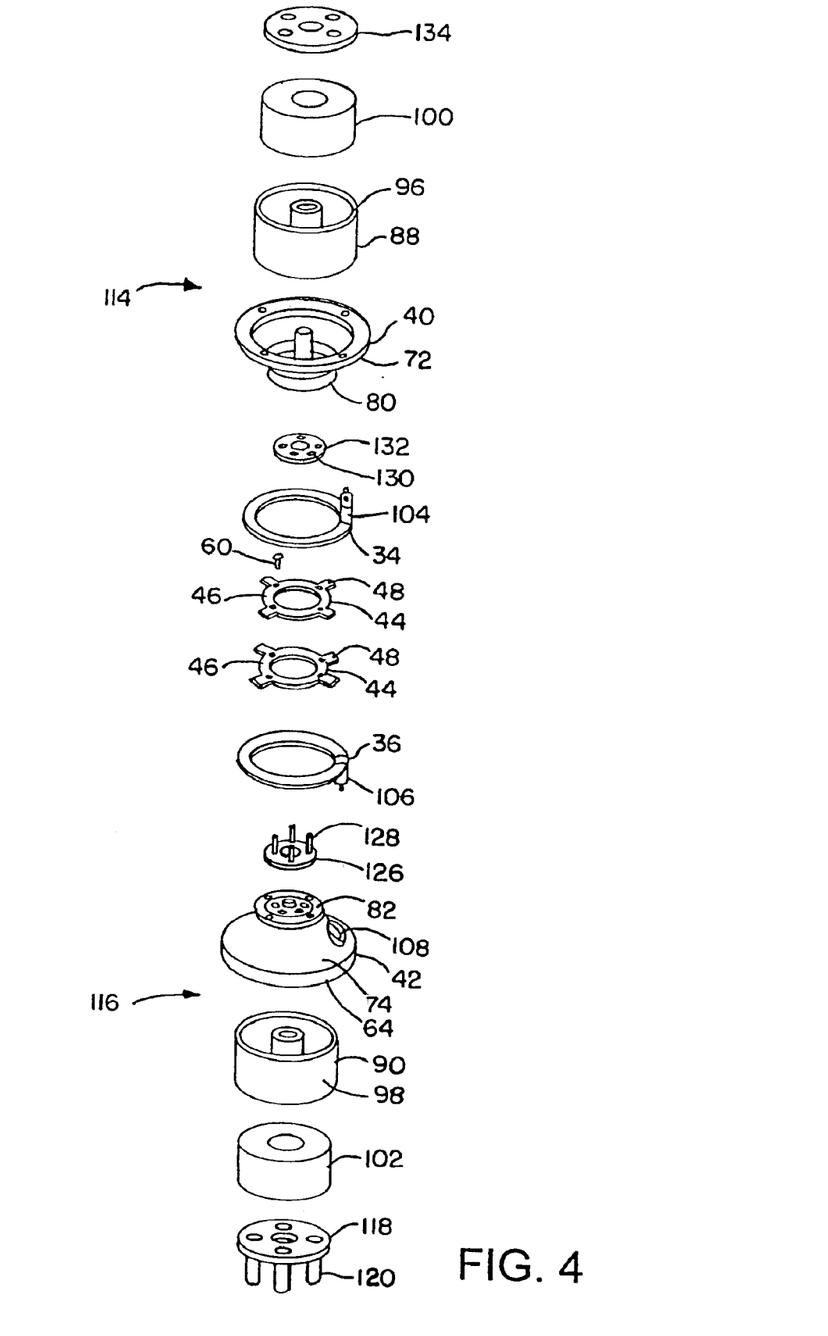
FIG. 4 is an exploded perspective view of the light fixture assembly included in the light of FIG. 1.

With additional reference to FIG. 4, the centering spacers 44 have central disk portions 46 from which support arms 48 radiate. As shown, four circumferentially equally spaced apart support arms 48 may be provided for each spacer. The radially outer ends 50 of the support arms 48 are contoured to support the corresponding flashtube 34, 36 and each arm 48 may have a hole 52 and slot 54 therein for receipt of a wire (not shown) wrapped around the flashtube 34, 36 to hold it to the support arm 48 and thus to the centering spacer 44. Each centering spacer 44 is affixed to the narrower end of a corresponding one of the upper and lower reflector halves 40 and 42 by suitable fastening means such as screws 60. Other, or alternative, types of spacers may be employed to support and maintain a spaced relationship between the main flashtube 34 and spare flashtube 36.

The upper and lower reflector halves 40 and 42 progressively decrease in diameter (width) going from their axially outer ends to their axially inner ends that are butted together at the waist 66 of the hourglass shape reflector 38. Each reflector member 40, 42 has an interior annular region (chamber) 68, 70 disposed between a radially outer wall 72, 74 and an interior center post 76, 78. The interior annular chamber 68, 70 is closed at the axially inner end of the reflector member 40, 42 by an axial end wall 80, 82 while the other end of the reflector member 40, 42 has an opening 84, 86 through which a trigger inductor assembly 88, 90 (FIG. 4) can be inserted into the interior region 68, 70. The trigger inductor assembly 88, 90 includes a PTFE inductor housing 96, 98 containing a trigger inductor 100, 102. The trigger inductor 100, 102 is electrically connected by leads (not shown) to terminal ends 104, 106 of the corresponding flashtube 34, 36. The terminal end portions 104, 106 extend perpendicularly to the plane of the otherwise annular flashtubes 34, 36. The terminal end portions 104, 106 extend through an opening 108 (only one of which is shown) in the radially outer wall 110, 112 of the reflector half 40, 42 and into the interior region 68, 70. After the electrical connections have been made, preferably the terminal ends 104, 106 and trigger inductor assemblies 88, 90 are potted into their respective interior region 68, 70 with a suitable potting compound.

Together each flashtube 34, 36, reflector half 40, 42 and trigger inductor assembly 88, 90 form a respective light module 114, 116. In the illustrated embodiment the light modules 114 and 116 are substantially identical except for their electrical connections. The trigger inductor module 90 and flashtube 36 of the lower light module 116 are electrically connected to a printed circuit board 118 fixed to the bottom (axially outer) end of the reflector half 42. The bottom printed circuit board 118 is provided with pins 120 to form a plug that mates with a corresponding socket (not shown) in the fixture base 30.

The bottom printed circuit board 118 also has through pins connected to an upper printed circuit board 126 at the axially inner end of the lower light module 116. The upper printed circuit board 126 is provided with pins 128 for mating with sockets provided on a printed circuit board 132 fixed to the bottom (axially inner) end of the upper light module 114. The sockets are electrically connected to the trigger inductor module 88 and flashtube 34, and any other supporting electrical circuitry may be provided on a printed circuit board 134 fixed to the top (axially outer) end of the upper light module 114.

With the foregoing preferred-construction of the light fixture 28, the light fixture 28 is assembled by plugging the upper and lower modules 114, 116 together and the lower module 116 to the fixture base 30. When thus assembled, the upper and lower light modules 114 and 116 may be held securely together and to the fixture base 30 by a bolt (not shown) that extends through the center tube 76, 78 and has its lower end threaded into the fixture base 30, such as into a nut fastener attached to the underside 136 of the top wall 138 of the fixture base 30 or by any other suitable means.

In view of the foregoing, it can be seen that the modular-construction of the light 10 facilitates replacement of a defective and/or worn out module 114, 116, as well as assembly of the light fixture 28 in the first instance. Together, the joined upper and lower light modules 114, 116 form the reflector 38 that is shared by and thus common to the two flashtubes 34 and 36.

The reflector 38 has an outer annular concave reflective surface 140 for reflecting light emitted by either one of the flashtubes 34, 36 substantially radially (horizontally) outwardly to provide 360 degree horizontally concentrated illumination. Preferably, the reflective surface 140 has upper and lower semi-parabolic shaped half surface portions 142 and 144 respectively formed on the upper and lower reflector halves 40, 42. The focal points of the half portions 142, 144 preferably are axially spaced apart such that the main flashtube 34 can be positioned at one focal point and the spare flashtube 36 can be positioned at the other focal point. Because of the annular nature of the reflector 38 and flashtubes 34, 36, the focal points are actually focal lines with which the annular axes of the flashtubes 34, 36 are aligned. Most preferably, the semi-parabolic shaped half surface portions 142 and 144 each extend slightly beyond the center plane 146 of the respective parabola but not so far as to shade any of the reflective surface from light emitted from either flashtube 34, 36. Although the focal points of the two half surface portions 142, 144 are spaced apart, they are sufficiently close to reflect and focus light emitted not only from the closest flashtube 34, 36 but also the furthest flashtube 34, 36.

As will be appreciated, the light rays passing from a flashtube 34, 36 to the nearest half surface portion 142, 144 of the reflector 38 will be reflected so as to pass generally radially away from the reflector 38 to provide a horizontally concentrated light pattern. However, the light rays passing from a flashtube 34, 36 to the furthest half surface portion 142, 144 will be outwardly divergent from the horizontal because the flashtube 34, 36 is oppositely spaced from the focal point of such furthest half surface 142, 144. In those applications where it is desirable to concentrate the light intensity within a specified angle from horizontal, such as 5 degrees for an aircraft recognition/anti-collision light, the cover 14 may be provided with a Fresnel lens 20 (other suitable lens means or equivalent) to redirect the otherwise wayward rays into the desired horizontal window.

As seen in FIG. 3, the Fresnel lens 20 differs from the classical Fresnel lens by having two convex lens 148, 150 at the center with prisms 152, 154 above and below. The two convex lens 148, 150 are respectively horizontally aligned with the flashtubes 34, 36. In essence, each flashtube 34, 36 has associated therewith a parabolic reflector 142, 144 and Fresnel lens 20, except that the portion of each such reflector 142, 144 and lens 20 that would interfere with the other is removed and the two brought together along a center plane 146 equal spaced from the horizontal planes of the flashtubes 34, 36. Of course, other shaped reflector surfaces 140 and/or lens 20 may be employed to provide other light patterns that may be desired for various applications.

As depicted in FIG. 2, the flashtube fixture 28 is provided with a light pipe (or other suitable light transmission means) 156 that extends from an aperture 158 located in the wall 74 of the reflector 38 and through an aperture 160 in the top wall 138 of the fixture base 30. Within the base 30, the light pipe 156 extends to a light detector 162, such as a photodiode, mounted on a printed circuit board constituting one of the electrical circuit components 32 (FIG. 3). The light pipe 156 attenuates and conveys light emitted by each flashtube 34, 36 to the photodiode 162 for monitoring of light intensity in the hereinafter described manner. The light intensity is monitored for the purpose of controlling the operation of light in the following preferred manner. Preferably, the light pipe 156 functions to calibrate the light attenuation as necessary for linear operation of the photodiode 162.

In operation, initially the main flashtube 34 is flashed at a desired frequency, such as at 42 flashes per minute which is within the flash rate range (40 to 100 fpm) mandated by FAA regulations for aircraft operation. The intensity of the flashtube 34 is monitored, preferably continuously, by the photodiode 162 and associated monitoring circuitry 32. If the measured intensity is found not to be in compliance with a predetermined criteria, for example the measured intensity falls below a minimum specified light intensity, such as the 100 candela mandated by FAA regulations, power to the main flashtube 34 is boosted. This "power boost" mode causes the main flashtube 34 to continue flashing above the FAA minimum effective intensity. Although this process can be repeated multiple times, preferably the power to the main flashtube 34 is boosted only one time instead of incrementally.

During the main flashtube power boost mode, continuous monitoring of intensity of the main flashtube 34 continues until once again the measured intensity is found not to be in compliance with a predetermined criteria, for example the measured intensity falls below a minimum specified light intensity, such as the 100 candela mandated by FAA regulations. At this point, flashing of the main flashtube 34 is stopped and in its place the spare flashtube 36 is flashed. Now it is the intensity of the spare flashtube 36 that is monitored. If the measured intensity falls below the minimum specified light intensity threshold, power to the spare flashtube 36 is boosted. This "power boost" mode causes the spare flashtube 36 to continue flashing above the FAA minimum effective intensity.

During the spare flashtube power boost mode, continuous monitoring of intensity of the spare flashtube 36 continues until once again the measured intensity is found not to be in compliance with a predetermined criteria. At this point the spare flashtube 36 is caused to flash at a different rate to provide an indication that the light is close to the end of its useful life. For example, the spare flashtube 36 may be caused to flash at twice its normal frequency. Although changing the flash rate provides an effective way of indicating a need to service the light, other indicating means may be employed such as providing an indicator light on the light unit, supplying a warning signal to the aircrafts control system for appropriate processing, such as display on a panel or screen in the cockpit, storing an indicator warning in memory for read-out by diagnostic equipment, etc.

The foregoing describes a preferred sequence of operation of the main and spare flashtubes 34 and 36. However, it should be appreciated that the sequence may be varied and/or portions thereof used in conjunction with a light having more or less flashtubes. For example, the power boost feature may be used with a single flashtube light to extend the useful life of the light. Also, the first and second flashtubes 34, 36 may be sequentially cycled through their normal power modes first, and then cycled through their power boost modes. Moreover, the first and second flashtubes 34, 36 may be alternately flashed according to some specified criteria, such as alternately for a specified period or number of flashes. For example, the main flashtube 34 may be flashed for 1000 flashes, then the spare tube for 1000 flashes, then the main tube for 1000 flashes, and so on. Should either tube's light output intensity fall below the minimum, it may be operated in the power boost mode, no longer operated, or flashed at a different rate to indicate a need for servicing.

Figure 5:
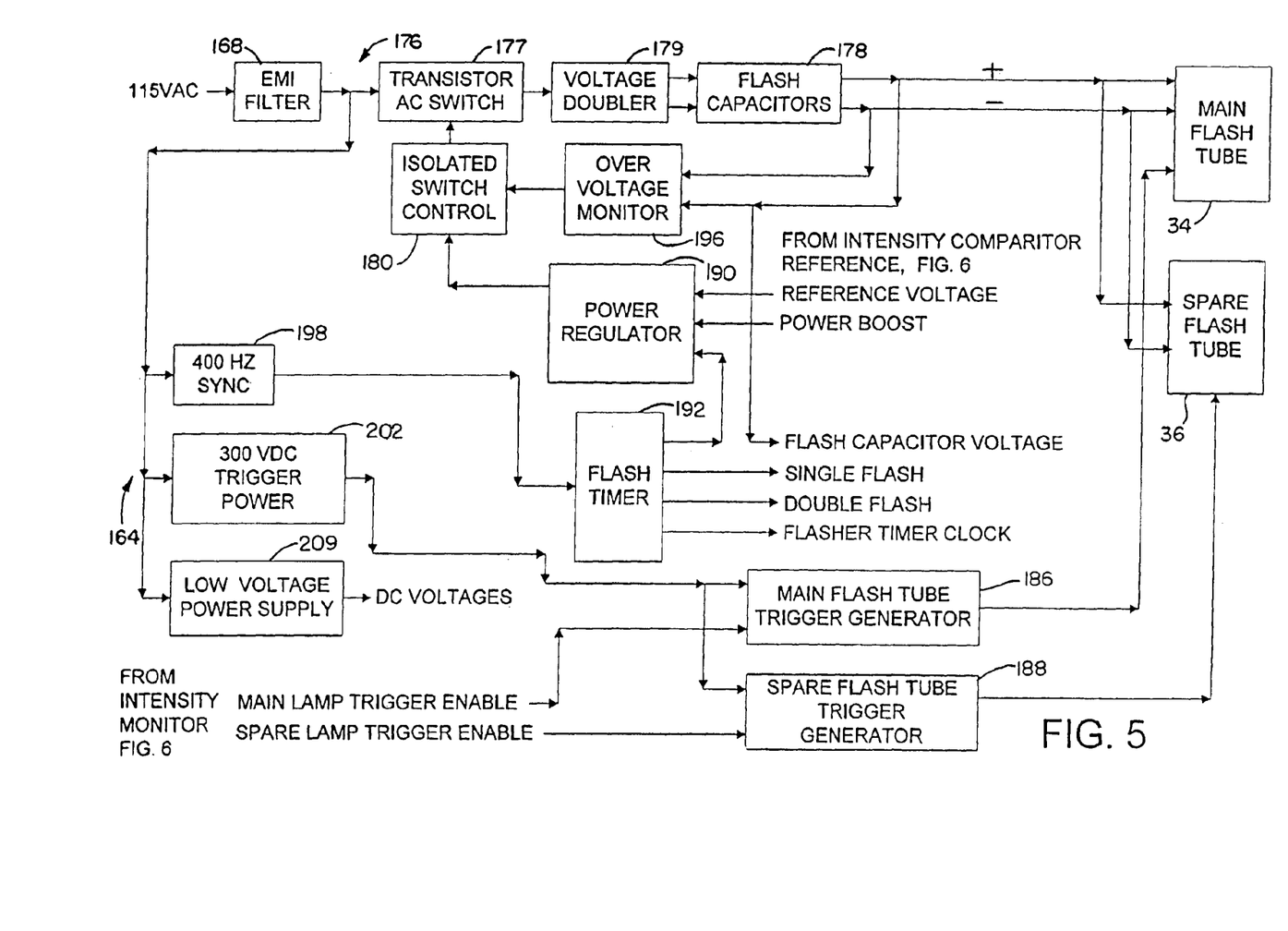
FIGS. 5 and 6 are interrelated functional block diagrams of the electrical circuitry used in the light of FIG. 1.
Figure 6A:
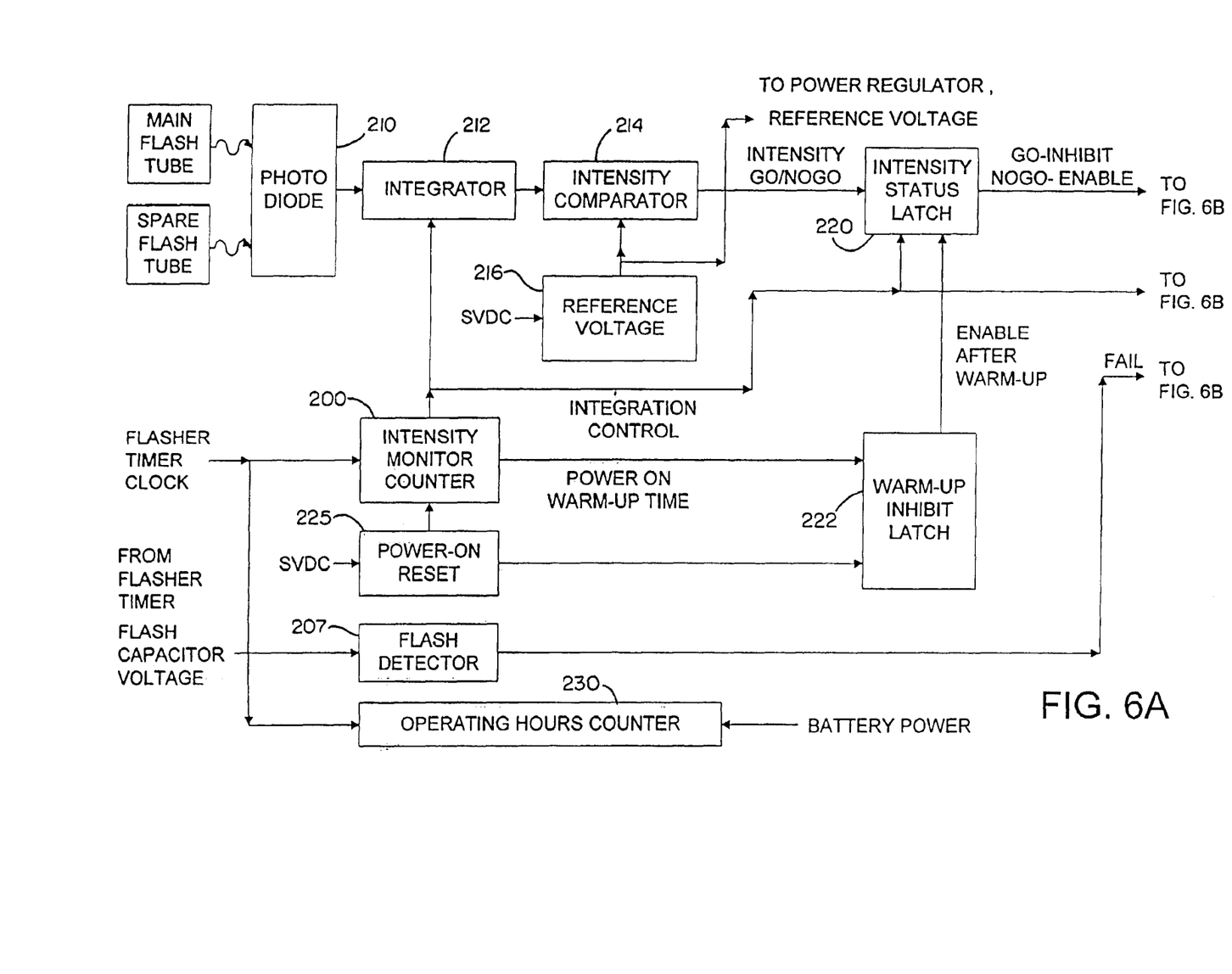
Figure 6B:
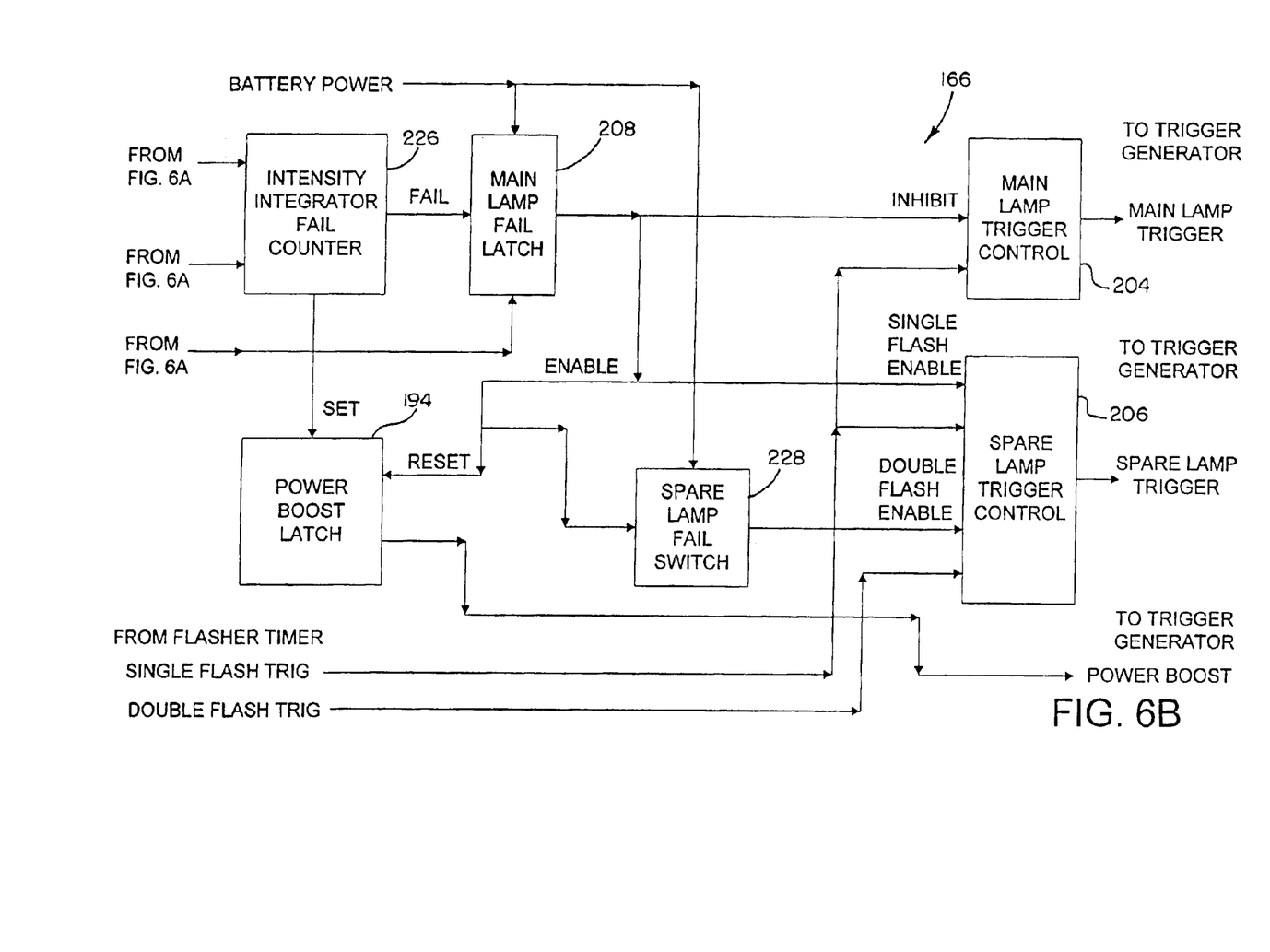

The above described operation of the anti-collision light 10 is effected by the electrical circuitry 32, the functional components of which are illustrated by the functional block diagrams of FIGS. 5 and 6. The electrical circuitry 32 according to a preferred embodiment of the invention generally comprises power supply circuitry generally indicated at 164 in FIG. 5, and control and monitoring circuitry generally indicated at 166 in FIG. 6, respectively.

Referring principally to FIG. 5, the power supply circuitry 164 includes an EMI filter 168 to which input power is routed, such as 115 VAC provided on an aircraft. The EMI filter 168 attenuates noise generated in a power supply 176 from being coupled on the aircraft power line. The EMI filter 168 also suppresses noise on the power line that could affect the operation of the power supply. The EMI filter 168 may be housed in an EMI can 172 provided in the housing 12 and equipped with an external power connector 174 as shown in FIG. 3.

The filtered power is used to power the circuits of the power supply 176. The power supply 176 includes a transistor AC switch 177 which controls the filtered AC power that is used for charging flash capacitors 178. A preferred switch consists of two FET transistors in an AC bridge configuration that has slow turn-on to reduce in-rush current when the flash capacitors 178 start to charge. The transistor on/off control may be provided by an isolated switch control circuit 180 that takes low voltage control signals that are referenced to ground and converts them to control signal referenced to 115 VAC. A voltage doubler circuit 179 converts the 115 VAC to approximately +280 VDC and −280 VDC for use as capacitor charging voltages. The voltage doubler 179 is capable of producing 320 VDC from 115 VAC. The actual voltage developed is controlled by the power regulator 190 and can vary between 250 VDC and 295 VDC.

The flash capacitors 178 are used to supply the energy used by the flashtube 34, 36. In a preferred embodiment, four capacitors may be arranged in two parallel sets that are connected in series. The flashtube 34, 36, which may be a xenon gas flashtube, is connected across the series connected capacitors and provides a desired voltage of about 500 to 600 volts, for example, to the flashtube 34, 36.

More particularly, the anode and cathode of each flashtube 34, 36 is connected to the outputs of the capacitors 178. In a preferred arrangement, the cathode of each tube 34, 36 is connected to the minus capacitor through the secondary winding of the trigger inductor 100, 102 (transformer). The primary winding of the trigger inductor 100, 102 is connected to a respective flashtube trigger generator circuit, there being a main flashtube trigger generator circuit 186 for the main flashtube 34 and a spare flashtube trigger generator circuit 188 for the spare flashtube 36. When a trigger pulse, for example a −275 volt pulse, is applied to the primary winding of the trigger transformer, a high voltage negative pulse, for example −5000 V to −7000 V, is developed by the transformer secondary winding. This voltage causes the xenon gas in the flashtube 34, 36 to change from an insulator to a low resistance conductor, whereupon the flash capacitors 178 discharge through the flashtube 34, 36 creating a brilliant white flash of light. A grounded wire may be wrapped around the outside of the flashtube 34, 36 to help propagated the ionization gas in the flashtube 34, 36 and provide shielding for EMI generated by the flashtube 34, 36 when it fires. This minimizes cross-talk between the main and-spare flashtubes 34, 36. Also, this method of triggering the flashtubes 34, 36 provides several other advantages. In particular, it permits the flashtubes 34, 36 to be mounted in close proximity to one another in stacked relationship which, in turn, allows the common reflector 38 to be used for both flashtubes 34, 36. As a consequence, the optical design of the reflector 38 and lens 20 is greatly simplified. Another advantage is that series trigger circuits provide trigger voltage isolation between flashtubes 34, 36 so that trigger coupling between the closely spaced flashtubes 34, 36, which typically causes erratic flashing in parallel trigger circuits, is prevented. The series trigger circuit also provides electromagnetic shielding for the flashtubes 34, 36 which reduces electromagnetic interference (EMI) that the flashtubes 34, 36 are exposed to during initial triggering. It also reduces the amount of EMI suppression required to meet FAA imposed EMI requirements.

The charging of the flash capacitors 178 is controlled by a power regulator 190. After a flashtube 34, 36 fires and the flash capacitors 178 are discharged, the regulator 190 receives a timing signal from a flasher timer 192 to start charging the capacitors 178. The regulator 190 supplies a signal to the isolated switch control 180 that is used to turn-on the transistor AC switch 179, starting the charging cycle. After the capacitors 178 have been charged to the voltage needed to obtain the required power, the power regulator 190 turns off the signal to the isolated switch control 180 which turns off the AC power to the flash capacitors 178. As the capacitors 178 age and their capacitance changes, the power regulator 190 adjusts the capacitor charging voltage to keep the power output constant, which output is a function of the flash capacitor capacitance and the capacitor voltage. This keeps power at a minimum level and extends the life of the flashtube 34, 36. When the flashtube intensity decreases below the minimum threshold, an intensity monitor power boost latch 194 (FIG. 6) sends a signal to the power regulator 190 to increase the power to the flashtube 34, 36. This will increase the intensity and provide additional operating time for the flashtube 34, 36 as was discussed above.

The regulator 190 preferably has associated therewith an over voltage monitor 196 that measures the positive and negative flashtube voltages. If the charging voltage increases above a specified amount, for example, plus or minus 300 VDC, the over voltage monitor 196 overrides the power regulator 190 with a turn-off signal to the isolated power control circuit 180. This would occur, for example, if the flashtube 34, 36 does not fire. In such event, the power regulator 190 would attempt to charge the already charged capacitors 178 and would, if not stopped by the over voltage monitor 196, overcharge the capacitors 178, and this may reduce their useful life.

As further shown in FIGS. 5 and 6, the electrical circuitry includes a sync circuit 198 that supplies a sync signal, for example a 400 Hz signal, to the flasher timer 192. This signal is used to control all timing functions in the power supply 176 via the flasher timer 192 which generates timing signals required by the power regulator 190 and the trigger generators 186, 188. The timer 192 also generates a timing signal for control of an intensity monitor circuit 200 that is discussed below. The trigger generators 186, 188 are capable of producing a flashtube trigger at a normal rate of 42 flashes per minute for example, and at least the spare trigger generator 188 is capable of producing a flashtube trigger at a different rate such as twice the normal rate or a double flash trigger signal.

The power for the flashtube triggers 186, 188 is provided by a trigger power circuit 202. The trigger power circuit 202 may be a positive voltage doubler for supplying 300 VDC to the flashtube trigger generators 186, 188. Each flashtube generator 186, 188 produces, for example, a −275 volt pulse that is connected to the trigger coil of the trigger transformer 100, 102 for the flashtube 34, 36. The pulse may be generated by a capacitor discharge SCR circuit that is controlled by the lamp intensity monitor trigger control circuit 204, 206. If the flashtube 34 fails to fire, the capacitor voltage will be at a steady value, either low or high depending on the cause of the flash not firing. A flash detector 207 monitors the charging and discharging of the flash capacitors 178. If they are at a steady voltage and not being charged and discharged for a predetermined time period, the flash detector 207 generates a fail signal that is sent to a main flashtube fail latch 208 to initiate the switching to the spare flashtube 36. Similarly, the spare flashtube generator 188 produces, for example, a −275 volt pulse that is connected to the secondary trigger coil of the trigger transformer 102 for the spare flashtube 36. The pulse may be generated by a capacitor discharge SCR circuit that is controlled by a spare lamp intensity monitor trigger control circuit 206.

As further seen in FIG. 5, the power supply 176 further comprises a low voltage power supply 209 for supplying low DC voltage to the flasher power supply circuit and intensity monitor circuit. The low voltage power supply 209 may include a transformer that steps the 115 VAC down to the desired DC voltages such as ±10 VDC and ±5 VDC. The transformer may also have an isolated winding that provides power to the isolated switch control circuit 180.

Referring now principally to FIG. 6, the intensity monitor and control circuit 166 includes a photodiode circuit 210 including the photodiode 162 which as above noted continuously monitors the light intensity of the operating flashtube 34, 36 via the light pipe 156. The photodiode circuit 210 provides an output signal to an integrator circuit 212 that is proportional to the light intensity generated by the then operating flashtube 34, 36. As is preferred, the photodiode 162 is selected to produce a response that approximates the response of the human eye and to quantify the light intensity in candela, a photometric measurement allowing the intensity to be compared to requirements for FAA approved intensity photometric test measurements. The photodiode 162 should also be capable of providing a stable output over the full operating temperature range of the flashtubes 34, 36. If the output of the photodiode circuit 210 or alternative light sensor is temperature sensitive, then temperature compensation could be provided to provide a normalized output. As is preferred, the photodiode 162 may be packaged in a metal hermetically sealed case with a glass window for environmental protection.

The integrator circuit 212 converts the measured light intensity provided by the photodiode circuit 210 into an integrated output voltage which is a function of the light intensity of the flash emitted by flashtube 34, 36. Since the light intensity of the flashes typically varies by a small amount, the light from multiple flashes is integrated to obtain an average intensity. Averaging the light intensity from multiple flashes provides a more stable signal for the determination of the actual light intensity output and prevents a false lamp fail signal from being generated as a result of occasional sub-threshold flash. Each time the flashtube 34, 36 flashes, the integration output voltage will increase by an amount proportional to the intensity of the flash. Thus, the voltage obtained at a particular time is equal to the total voltage of all the flashes measured up to that particular time. Thus, the output signal of the integrator 212 is a DC voltage proportional to the average intensity of the light output. After a prescribed number of flashes have been integrated, the output of the integrator 212 is compared by an intensity comparator 214 against a reference value provided by a reference voltage source 216 and then the integrator 212 is reset (to zero) by the intensity monitor counter 200 before measuring a next series of flashes.

The intensity comparator 214 monitors the output of the integrator 212 and produces an output indicative of whether the integrator 212 output satisfies or does not satisfy the comparison criteria. In the illustrated embodiment, the comparator 214 produces a GO or NOGO signal based on a comparison of the integrator 212 output signal to a reference voltage preferably supplied by the reference voltage source 216 which may be a stable temperature compensated voltage circuit. The reference voltage level may be set in relation to the FAA's minimum effective light intensity requirement, for example to correspond to the FAA's minimum effective light intensity requirement or slightly above such minimum requirement. If the integrator 212 output voltage is less than the reference voltage, the comparator 214 outputs a NOGO signal. If the integrator 212 output voltage is greater than the reference voltage, the comparator 214 outputs a GO signal.

Initially the integrator 212 output voltage will be below the comparator reference voltage and the comparator 214 will output a NOGO signal. As consecutive light flashes are measured, the integrated output voltage will gradually increase from zero volts to the final voltage measured for the prescribed number of flashes. When the integrator 212 output voltage rises above the reference voltage, the comparator 214 will output a GO signal. If the intensity of the flashtube 34, 36 decreases below the minimum limit, the comparator output will stay in a NOGO state.

After a set of flashes have been measured, the state of the comparator output is stored in an intensity status latch circuit 220 which is controlled by the intensity monitor counter circuit 200. The intensity monitor counter 200 is clocked by the flasher timer 192 and provides timing signals not only for the intensity status latch 220, but also for the integrator 212, a light warm-up inhibit latch 222 and an intensity integrator fail counter 226. At power turn-on the counter is set to zero by a power-on reset circuit 225 and synchronizes the operation of the counter.

After the intensity monitor counter 200 counts the prescribed number of flashes for a set of flashes to be integrated for comparison to the reference value, the counter 200 sends a clock signal to the intensity status latch 220 to have it store the GO/NOGO state of the intensity comparator output. This occurs shortly before the counter 200 resets the integrator 212, setting it to measure another set of flashes. The latch 220 then ignores the comparator output until the next set of multiple flashes is measured and another clock signal sent by the counter 200 to the intensity status latch 220.

Preferably the intensity status latch 220 is inhibited from outputting a NOGO signal for a preset period of time after the then active flashtube 34, 36 has been turned on. This allows the flashtube 34, 36 to warm up to its operating temperature. Under some low temperature conditions, the light intensity of the flashtube 34, 36 may be below the required intensity in which case a NOGO signal would be outputted by the comparator 214 and captured by the intensity status latch 220 when, after a warm-up period, the light intensity would otherwise rise above the required minimum. An inhibit signal may be supplied from latch 222 to the intensity status latch 220 for the prescribed period governed by the intensity monitor counter 200, that is, the time period may be based on a number of flashes needed to bring the flashtube 34, 36 up to its operating temperature.

The GO/NOGO status of the intensity status latch 220 is monitored by an intensity integrator fail counter circuit 226. The intensity integrator fail counter 226 prevents premature switching of the main flashtube 34 to the spare flashtube 36 when the light intensity of the main flashtube 36 approaches the minimum light intensity. Since the decrease in light intensity usually is gradual, light output may intermittently fall below the specified minimum light intensity. The intensity integrator fail counter 226, which is clocked by the intensity monitor counter 200, monitors the intensity status latch 220 for a predetermined number of consecutive NOGO output signals corresponding to consecutive multiple sets of flashes. If the prescribed number of consecutive measurements are NOGO, the intensity integrator fail counter 226 provides a fail signal in the form of a power boost latch set signal to the power boost latch 194 which enables the power boost mode of the power regulator 190. In response, the power regulator 190 increases the voltage to which the flash capacitors 178 are charged. The increased voltage corresponds to an increase in the light intensity of the main flashtube 34. This, in effect, extends the useful of the main flashtube 34. Moreover, this extends the lifetime of the main flashtube 34 beyond the life the main flashtube 34 would otherwise have had if operated at the higher voltage, as the lifetime of a flashtube typically decreases with increasing operating voltage.

After the power to the main flashtube 34 is boosted, the intensity integrator fail counter 226 continues to monitor the GO/NOGO status of the intensity status latch 220. If several consecutive measurements are NOGO, the intensity fail counter 226 provides a main lamp fail signal to a main lamp fail latch 208 for initiating switching to the spare flashtube 36. The main lamp fail latch 208 provides an inhibit signal to the main lamp trigger control 204 and an enable signal to the spare lamp trigger control 206 (during operation of the main flashtube 34 the main lamp fail latch 208 outputs an inhibit signal to the spare lamp trigger 206 to prevent the spare flashtube 36 from flashing). The main lamp fail latch 208 also provides a reset signal to the power boost latch 194 which causes the power regulator 190 to charge the flash capacitors 178 to the original or normal power settings. The spare flashtube 36 will now be flashed in place of the main flashtube 34.

During flashing of the spare flashtube 36, the intensity integrator fail counter 226 continues to monitor the GO/NOGO status of the intensity status latch 220 and the output of the intensity integrator fail counter 226 is sent to a spare lamp fail latch circuit 228. If several consecutive measurements are NOGO, the intensity integrator fail counter 226 provides a lamp fail signal to the power boost latch 194 which enables the power boost mode of the power regulator 190. In response, the power regulator 190 increases the voltage to which the flash capacitors 178 are charged. The increased voltage corresponds to an increase in the light intensity of the spare flashtube 36. This, in effect, extends the useful life of the spare flashtube. Moreover, this extends the lifetime of the spare flashtube beyond the life the spare flashtube would otherwise have had if operated at the higher voltage.

After the power to the spare flashtube 36 is boosted, the intensity integrator fail counter 226 continues to monitor the GO/NOGO status of the intensity status latch 220. If several consecutive measurements are NOGO, the intensity fail counter 226 provides a spare lamp fail signal to the spare lamp fail latch 228 which sends a double flash enable signal to the spare lamp trigger 206. The spare flashtube 36 is then double flashed to provide a visible indication to the air crew and/or ground maintenance personnel that the intensity of the light is near the FAA minimum level. In the preferred embodiment, the spare flashtube 36 flashes at 84 flashes per minute, which is twice the 42 flashes per minute in normal operation. Preferably, during double flashing, every other flash is generated at reduced power to limit the total power to the flashtube to a level that will not cause the flashtube to overheat and burn out. Notably, both the normal (42 FPM) and the double (84 FPM) flash rate fall within the FAA's acceptable flash rate range. The "double flash" rate alerts aircraft maintenance personnel that the light intensity of the anti-collision light 10 is near the minimum required effective intensity and that servicing of the anti-collision light 10 is required. The spare flashtube 36 will continue to double flash until repaired or replaced. As is preferred, battery power is provided when the light 10 is turned off to retain the low intensity status until power is reapplied.

After both lamps have reached their end-of-life, it may be desirable to flash both lamps simultaneously to generate sufficient light output from the light fixture. This may require some redundancy such as two sets of flash capacitors.

An operating hours counter circuit 230 counts the number of flashes that have been accumulated by the flashtubes 34, 36. The counter 230 is clocked by the flasher timer 192 and increments each time a flashtube 34, 36 fires. As is preferred, the counter 230 is powered from battery power and retains its count when the light 10 is not powered. In a preferred embodiment, the counter 230 is capable of recording about 26,000 hours of operation (about 67 million flashes) and can only be reset during maintenance when the flashtubes 34, 36 are replaced.

Although the invention has been shown and described with respect to certain preferred embodiments, equivalent alterations and modifications will occur to others skilled in the art upon reading and understanding this specification and the annexed drawings. In particular regard to the various functions performed by the above described integers (components, assemblies, devices, compositions, etc.), the terms (including a reference to a "means") used to describe such integers are intended to correspond, unless otherwise indicated, to any integer which performs the specified function of the described integer (i.e., that is functionally equivalent), even though not structurally equivalent to the disclosed structure which performs the function in the herein illustrated exemplary embodiment or embodiments of the invention. In addition, while a particular feature of the invention may have been described above with respect to only one of several illustrated embodiments, such feature may be combined with one or more other features of the other embodiments, as may be desired and advantageous for any given or particular application.

What is claimed is:

1. A recognition light comprising:
   a spool-shaped reflector having an axis, a waist, and first and second annular semi-parabolic reflective surfaces which have respective focal points axially spaced apart from one another; and first and second annular lamps disposed around the waist of the spool-shaped reflector at the focal points of the first and second annular semi-parabolic reflective surfaces, respectively.

2. The recognition light of claim 1, comprising a control circuit for sequentially operating the first and second annular lamps.

3. The recognition light of claim 1, comprising a cover surrounding the reflector and lamps, the cover including a lens for focusing the light along a plane perpendicular to the axis of the reflector.

4. The recognition light of claim 1, the lens having first and second Fresnel lens portions each including a convex lens and a prism lens, the convex lenses being disposed adjacent one another and transaxially aligned with the first and second lamps, respectively.

5. The recognition light of claim 1, wherein the semi-parabolic reflective surface comprises a half-parabolic reflective surface.

6. The recognition light of claim 1, wherein the first and second lamps are substantially circular in shape.

7. The recognition light of claim 2, wherein the first and second lamps are coaxial.

8. The recognition light of claim 1, wherein the first lamp is spaced from the second lamp by one or more spacers.

9. The recognition light of claim 8, wherein the one or more spacers comprise cantilevered spacer bars projecting outwardly from a location between the first and second annular semi-parabolic reflective surfaces.

10. The recognition light of claim 1, wherein the first and second annular semi-parabolic reflective surfaces are each greater in size than that of a half parabola.

11. The recognition light of claim 1, wherein the reflector has first and second annular semi-parabolic reflective surfaces which have respective focal points axially spaced apart from one another, and the first and second annular semi-parabolic reflective surfaces are each greater in size than that of a half parabola.

* * * * *